Figure 1:
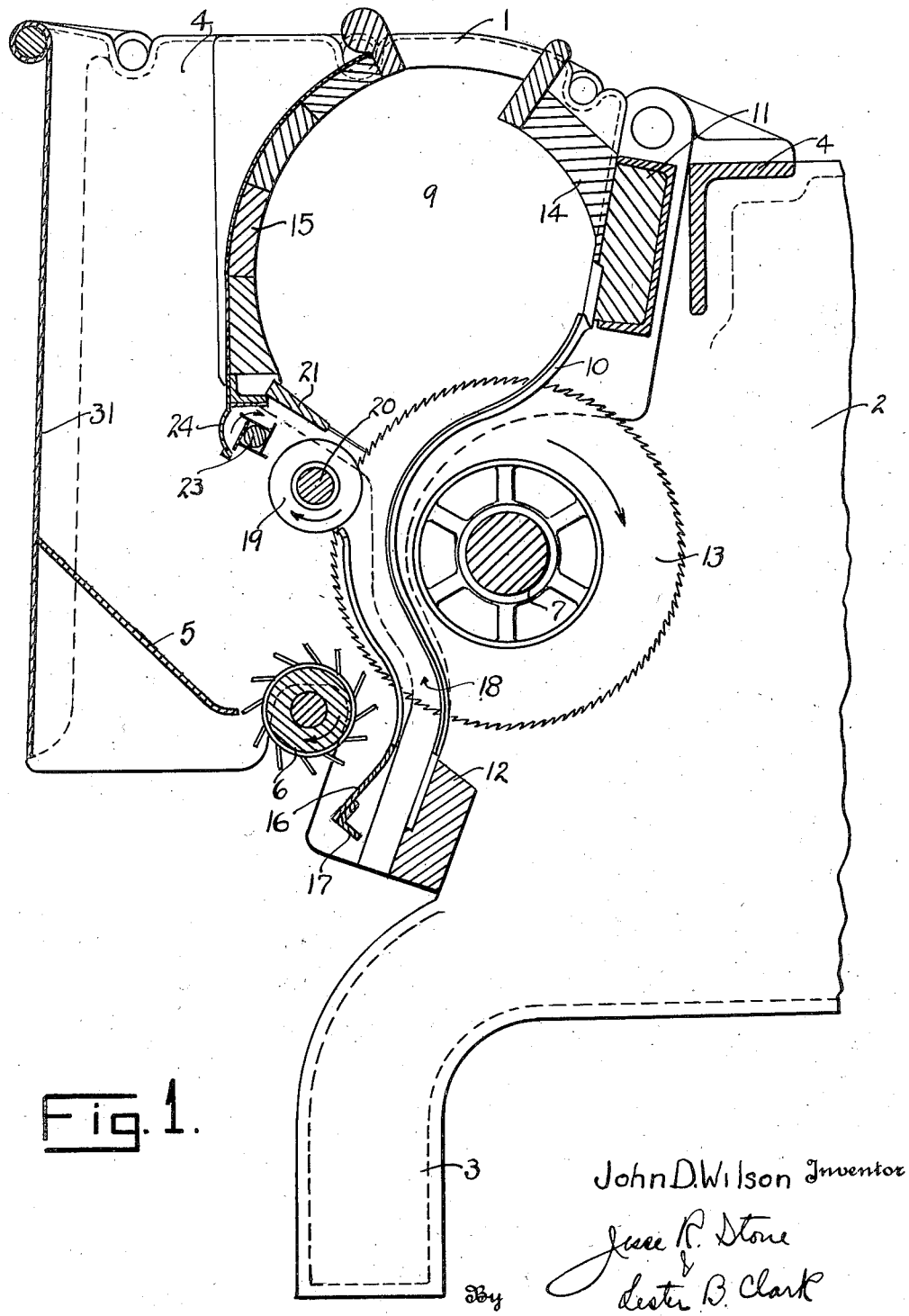

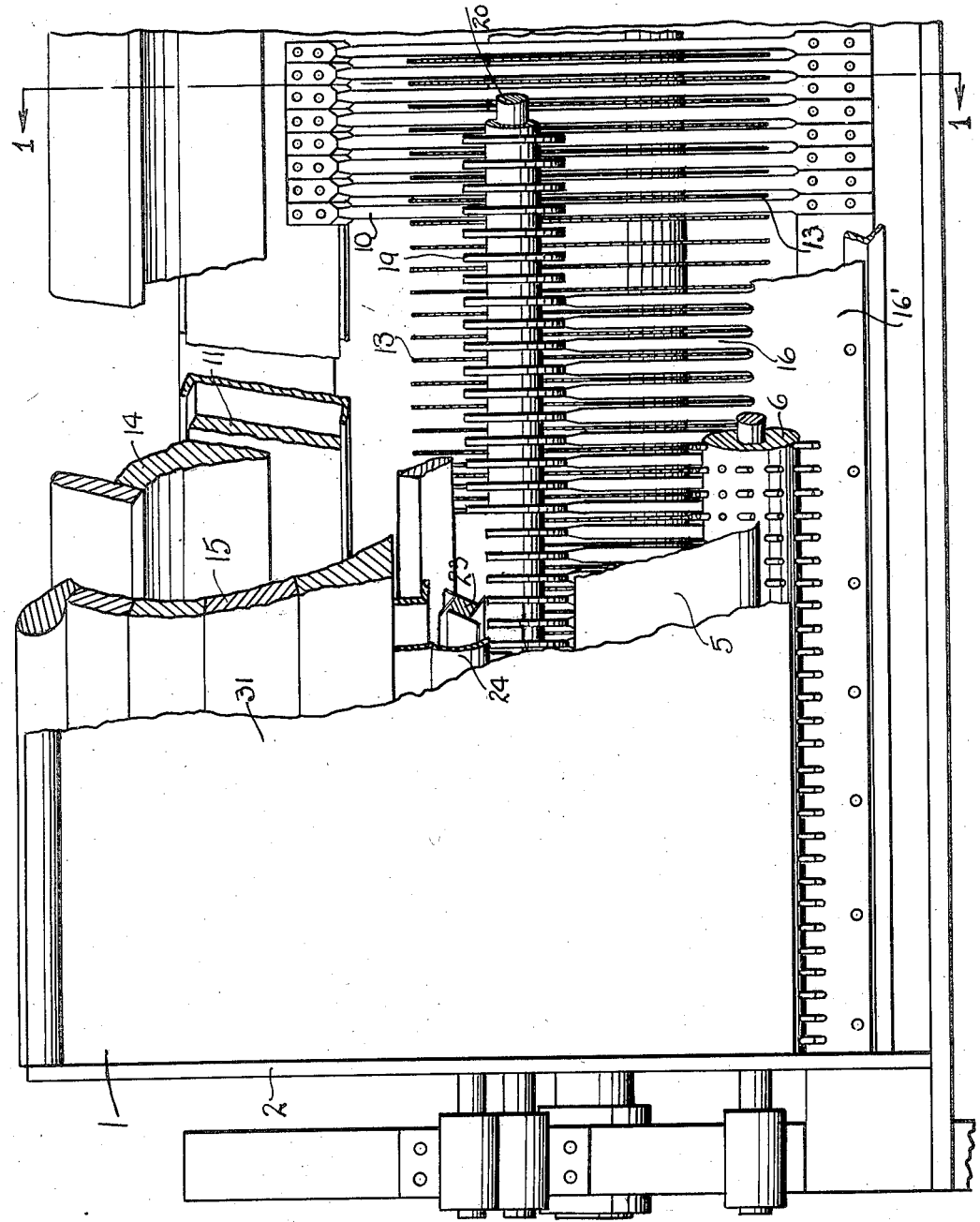

Patented Aug. 20, 1935

2,011,838

UNITED STATES PATENT OFFICE 2,011,838

HULLER TYPE COTTON GIN

John D. Wilson, Lufkin, Tex., assignor of one-half to Lufkin Gin Company, a corporation Application February 2, 1932, Serial No. 590,332

6 Claims. (Cl. 19—56)

My invention relates to an improvement in cotton gins of the huller type and has particular application to means for cleaning the hulls and chaff from the cotton before the ginning operation.

In the usual apparatus for eliminating the hulls from the cotton employed with cotton gins it has been difficult to prevent a large amount of chaff and other foreign matter from passing with the lint to the cotton roll. The hulls tend to be moved with the lint past the huller ribs and are drawn into the gin.

It is an object of my invention to provide a hulling attachment, which will effectually eliminate the larger amount of hulls and chaff which might otherwise be carried along with the lint by the gin saws. I desire to use the ordinary picker roll to distribute the cotton to the gin cylinder and carry away the hulls, and to provide, in combination therewith, huller ribs cooperating with rotating ribs which carry the hulls away from the saw, and allow them to be eliminated from the gin through the action of the picker roll. I also desire to provide, in combination with the rotating ribs, a seal member which seals off the space above the rotating ribs and prevents the entrance of chaff or hulls above the huller ribs.

I aim particularly to increase the speed with which the gin may operate to free the seed cotton of hulls and other foreign matter and to decrease the damage to the cotton fibre in ginning.

I also desire to maintain a uniform, free and uncongested feed of cotton into the roll box, and to facilitate the movement of seed from the gin.

In the drawings herewith, Fig. 1 is a vertical section through a portion of a cotton gin showing my attachment thereon, said section being taken on the plane 1—1 of Fig. 2.

Fig. 2 is a broken front elevation of a cotton gin, parts being broken away to disclose the interior portions of the gin.

In the apparatus shown herewith a cotton gin of preferred construction is shown with my attachment thereon. Said gin includes a housing 1, having side walls 2 thereon, constructed in the usual manner to support the shafts, rolls and other mechanism and to house the working parts of the gin. The housing is supported upon legs 3, and the housing is preferably of metal casting and sheet metal. At the forward side is the gin breast 31 open above at 4 to receive the cotton to be ginned. At the lower side of the breast is a baffle or deflector 5 inclined downwardly toward the picker roll 6.

The gin saw cylinder is mounted upon the shaft 7, supported at its ends in the side walls of the housing and is adapted to rotate in a clockwise direction as viewed in Fig. 1. Said saw cylinder is above and to the rear of the picker roll. The gin ribs 10 are mounted at their upper and lower ends upon the rib bars 11 and 12, respectively, and mesh between the gin saws 13 in the usual manner.

Above the gin cylinder is the roll box 9 with a rear wall 14 secured to the rib bar 11, and a forward wall 15, secured at its ends to the side walls 2 of the housing. The saws 13 extend into the lower side of the box to engage the cotton therein.

The hulling mechanism is arranged on the forward side of the gin ribs 10. It includes a set of huller ribs 16 formed upon a plate 16' secured to the rib bar 17, and extended upwardly and forwardly between the saws 13 on the saw cylinder. As will be noted from Fig. 1, the huller ribs are approximately parallel with the gin ribs and spaced evenly therefrom to provide a passage 18 for the cotton seed. The free upper ends of the huller ribs terminate above the center of the gin cylinder closely adjacent the rotary rib member 19. Said member comprises a shaft 20 having mounted thereon in spaced relation a series of discs which, as will be seen from Fig. 2, are aligned with the ribs 16, but are far enough apart to allow the passage of the seed cotton between them. The rotary ribs turn in a clockwise direction as does the saw cylinder.

Above the rotary ribs 19 is a seed board 21, hinged at its ends to the lower edge of the front wall 15 of the roll box 9. Adjacent the saw and spaced closely above the rotary ribs the seed board is formed with spikes or pins meshing between the saws 13, tending to regulate the degree of cleaning the seed of its lint.

The rotary ribs 19 tend to carry hulls and chaff away from the saws and a seal is provided above the rotary ribs to prevent the carrying of chaff around the upper side thereof. Said seal includes a stripper 23 comprising a shaft having a plurality of blades or wipers mounted tangentially of the shaft and tending, when said shaft is rotated, to move material away from the rotary ribs. On the forward side of the wiper is a curved shield 24, which directs the freshly received seed cotton away from the wiper.

The operation of this gin is not materially different from the ordinary gin insofar as the ginning operation is concerned. However, the arrangement of the huller attachment is found to be particularly efficient. The combination of the stationary ribs 16 with the rotary ribs 19 has been found to be particularly effective. The stationary ribs obstruct the passage of the hulls to the seed duct 18 and prevent mixing of hulls with the seed. The seed cotton and hulls are moved by the saws toward the roll box. At the upper portion of the stationary ribs the rotary ribs enggage the cotton at the point where the saw tends to carry the hulls through into the roll box. As the ribs rotate in the same direction as the saw they strike the hulls and other foreign particles, tending to knock them over into the gin breast and down where they can be engaged by the picker roll and carried along the plate 16 and ejected from the machine. The rotary ribs are prevented from carrying material around the upper side by the seal member which wipes material from the said ribs. By the particular combination thus arranged, I am enabled to provide against hulls or chaff finding their way through with the cotton lint and a much better quality of staple is thus produced.

Another feature of particular advantage connected with my device is that the accumulation of seed or cotton or other material between the huller ribs and the gin ribs is avoided A clear space for the seed between the two sets of ribs is obtained which allows the seed to be easily removed from the machine and allows the gin saws to effectively engage the cotton without clogging and to carry the same past the huller ribs. Each approaching lock of cotton with its seeds and foreign matter is cleaned of the foreign material and carried into an uncongested space between the revolving discs and into the roll box. The staple of the cotton is therefore not damaged due to cutting and tearing brought about by congestion between the two sets of ribs as is now commonly experienced. The quality of the cotton is improved not only from the absence of foreign material therein but through the fact that the fibre is not torn or broken in the huller operation.

Further the rotary huller ribs project into the seed duct space 18 and by the downward movement of the peripheries of the ribs at that point, assist in carrying the seed downwardly to the outlet and prevent any clogging of the seed in front of the gin ribs. Thus a continuous and effective operation under higher speeds than heretofore allowable is made possible.

Having described my invention, what I claim is:

1. In a cotton gin, a housing, a gin breast to receive the cotton, a saw cylinder to the rear of said breast, a picker roll at the lower side of said breast, gin ribs between the saws of said cylinder, stationary huller ribs projecting upwardly in position spaced uniformly from said gin ribs to form a seed passage, and a series of rotating discs above said stationary huller ribs extending between said saws and acting to move the hulls away from said saws and to keep said passage free, and a rotary wiper above said rotating discs, to seal against the passage of hulls above said discs.

2. In a cotton gin, a housing, a saw cylinder having saws thereon rotatable in said housing, a roll box above said cylinder, ginning devices cooperating with said saws to eliminate cottonseed and means in front of said devices to prevent the passage of hulls to said roll box, including a set of stationary ribs between the lower portions of said saws and rotating ribs above said stationary ribs at the forward side of said roll box between said saws, said ribs being spaced uniformly in front of said devices to provide a passage therebetween said rotating ribs acting to move seed downwardly in said passage.

3. In a cotton gin, a housing, a saw cylinder havings saws thereon rotatable in said housing, a roll box above said cylinder, ginning devices cooperating with said saws to eliminate cottonseed and means in front of said devices to prevent the passage of hulls to said roll box, including a set of stationary ribs between the lower portions of said saws and rotating ribs above said stationary ribs between said saws, said ribs being spaced uniformly in front of said devices to provide a passage therebetween, and a rotating wiper adjacent the upper rims of said rotating ribs.

4. In a cotton gin, a housing, a saw cylinder rotatable therein, a roll box above said cylinder, gin ribs cooperating with said saw cylinder, stationary huller ribs secured at their lower ends below said cylinder and having their upper free ends extending between the saws of said cylinder, rotating disc shaped huller ribs above the ends of said stationary huller ribs cooperating with said stationary ribs to prevent the passage of hulls to said roll box, said discs being rotated in a direction to move said hulls away from said cylinder, there being a seed passage between said rotating ribs and said gin ribs, said rotating huller ribs having their downwardly moving sides projecting into said seed passage, and a picker roll adjacent the lower ends of said huller ribs.

5. In a cotton gin, a housing, a gin breast to receive the cotton, a saw cylinder to the rear of said breast, a roll box above said cylinder, a picker roll at the lower side of said breast, gin ribs between the saws of said cylinder, stationary huller ribs projecting upwardly in position spaced uniformly from said gin ribs to form a seed passage, and a series of rotating discs above said stationary huller ribs extending between said saws at the forward side of said roll box, and acting to move the hulls away from said saws and to keep said passage free.

6. In a cotton gin, a housing, a rotating saw cylinder mounted therein, gin ribs cooperating with said cylinder, a roll box above said cylinder, a seed board, stationary huller ribs secured below said cylinder and extending upwardly between the saws of said cylinder, spaced from said gin ribs to form a passage, the upper ends of said huller ribs being free, rotating ribs adjacent the upper ends of said stationary ribs, and below said seed board, the rotation of said discs acting to assist in keeping said passage from clogging and a picker roll to agitate the cotton and remove hulls from said housing.

JOHN D. WILSON.